UNITED STATES PATENT OFFICE 2,218,244

CHEMICALLY BONDED REFRACTORY

Frank Eugene Lathe, Ottawa, Ontario, Norman Percy Pitt, Westmount, Quebec, and Lisle Hodnett, Ottawa, Ontario, Canada, assignors, by mesne assignments, to Canadian Refractories Limited, Montreal, Quebec, Canada, a corporation of Canada No Drawing. Original application April 24, 1937, Serial No. 138,742. Divided and this application April 17, 1939, Serial No. 268,337

4 Claims. (Cl. 106—89)

This invention relates to chemically bonded plastic and granular materials, including refractories, and is particularly directed to providing a bonded material of uniformly high strength throughout when a soluble silicate is used in binding together finely divided or granular particles, as in the production of cements, mortars and molded masses of refractory materials.

In the use of a silicate binder it has been observed that there is an actual travel or migration of the soluble silicate to the surface of the bonded material during the process of drying, resulting in an increased concentration of the binder at the very surface and a correspondingly weakened internal portion. Not infrequently this phenomenon takes place to such an extent that the surface can hardly be indented with a knife, while the internal portion can be readily crumbled in the fingers. Analysis of the exterior and interior portions of a refractory or other material bonded with sodium silicate shows the extent to which such migration takes place.

It is known that silicate solutions are readily decomposed by acids or other electrolytes, setting to form gels of silicic acid, whereby the solutions lose their valuable adhesive properties. In United States Patent 631,719, August 22, 1899, Imschenetzky discloses a method in which asbestos is treated with a solution of sodium silicate containing sodium bicarbonate. He states that colloidal silica is precipitated, permitting the mass to be handled and immersed in a bath of sodium bicarbonate, as a result of which all of the remaining sodium silicate is decomposed, with the precipitation of silica. The sodium carbonate formed in the reaction is recovered.

Applicants have found that, in plastic and granular materials bonded with soluble silicate, the decomposition of the silicate with precipitation of all contained silica results in almost complete lack of strength. It has been discovered, however, that the normal strength of the bond produced by a soluble silicate can be greatly increased and uniformly distributed throughout the mass of molded granular and plastic material. It is the object of the present invention to provide such a product and a method of producing it. The invention thus contemplates forming in situ in the molded or shaped mass a continuous, gelatinous and siliceous structure, containing a substantial portion of the silicate bond in the undecomposed condition, which prevents migration and insures strength. This may involve actual but incomplete precipitation in situ of a silicic gel containing soluble silicate, or only the formation of a gel without decomposition of the silicate. The mechanism of the formation of the structure is not fully understood but the coagulation of the silicate or other reaction between the silicate and the anti-migration agent within the shaped mass is important to avoid migration and to insure the desired strength of the bond.

In carrying out the invention, there is mixed with sodium silicate a suitable proportion of an anti-migration agent, and this mixture is uniformly incorporated in the mass of crushed or granular material to be bonded, in such a manner that the anti-migration agent causes the formation, in situ of the continuous, gelatinous, and siliceous structure described.

As anti-migration agents, there may be used the carbonate, bicarbonate, chlorate, nitrite and nitrate salts of sodium and potassium. Unlike strong acids and their salts and ammonia salts, these agents when used in suitable proportion do not cause immediate precipitation of gelatinous silica, but permit the gel formation of the character described to take place in situ and thus effectively prevent migration.

Of these reagents only the normal carbonate is effective when mixed with silicate in solution. It is less effective when mixed with dry silicate. For the latter, other anti-migration agents are normally employed.

Thus the normal carbonate is mixed with wet sodium silicate and the wet mixture is uniformly incorporated in the material to be bonded. When molded or shaped in position the anti-migration agent causes the formation of the continuous gel structure as the material dries and insures stability in position of the binder with the resultant increased strength of the product.

The other reagents are mixed with dry silicate, the mixture is uniformly incorporated in the mass of crushed or granular material to be bonded and the composite mass is moistened with water and promptly formed into shape or placed in its final position. The continuous gel structure forms and produces the desired results.

When the so shaped or formed mass has hardened it has a strength as much as several hundred per cent higher than that obtained with a similar binder without the anti-migration agent. Moreover the uniform distribution of the strength through the mass is of great importance. If greatest strength is not required, the amount of the soluble silicate binder used may be reduced, with the consequent saving in cost as well as increased refractoriness in the product.

| Refractory material | With anti-migration agent ||| No anti-migration agent, tensile strength |
|---|---|---|---|---|
| | Agent used | Quantity used, percent | Tensile strength, lb. per sq. in. | |
| Various mixtures of basic and neutral refractories | Sodium chlorate | 2.0 | 375 | 105 |
| | Sodium nitrate | 2.0 | 330 | 185 |
| | Sodium bicarbonate | 0.5 | 710 | 410 |
| | Potassium bicarbonate | 1.1 | 425 | 320 |
| | Potassium chlorate | 2.0 | 555 | 320 |
| | Potassium nitrite | 1.5 | 480 | 320 |
| Clay | Sodium carbonate | 2.0 | 475 | 300 |
| Neutral refractory | Sodium bicarbonate | 0.7 | 670 | 290 |
| Do | Sodium nitrite | 1.5 | 730 | 240 |

It is not practicable to specify a definite percentage of each agent to be used under all circumstances, owing to the wide range in the proportion of soluble silicate incorporated in different mixtures, the variation in the silica-alkali ratio of different soluble silicates, and the variations in the character of the materials to be bonded. These factors must be considered in determining the choice and optimum amount of anti-migration agent to be used. Furthermore, the time required to mold the refractory or put it in place indicates the delay required in the formation of the gel structure.

The selection of an anti-migration agent and the determination of the quantity to be used in each particular combination should be made experimentally. The following table illustrates the affect of various percentages of sodium bicarbonate as an anti-migration agent in a refractory bonded with sodium silicate.

| Percent of bicarbonate | Tensile strength in lb. per sq. in. |
|---|---|
| 0.0 | 165 |
| 0.4 | 175 |
| 0.6 | 340 |
| 0.8 | 385 |
| 1.0 | 455 |
| 1.3 | 480 |
| 1.6 | 290 |
| 2.0 | 225 |

It is evident that in this case 1.3% is approximately the optimum percentage of sodium bicarbonate, while as little as 0.6% is very effective. The falling off in strength with 1.6 and 2.0% of sodium bicarbonate reveals the effect of the decomposition of too much of the sodium silicate, leaving an unsatisfactory gel structure to form the bond.

The following examples illustrate the effect of various anti-migration agents and will, to some extent, serve as a guide in the choice of the most suitable agent and the determination of the amount to be used.

This application is a division of application Serial Number 138,742, filed April 24, 1937.

We claim:

1. In the preparation of chemically bonded plastic and granular materials, the method which comprises uniformly mixing with the material to be bonded a soluble silicate and not less than substantially 0.4% nor more than substantially 2% of an alkali metal chlorate to inhibit migration of said silicate within the mass and insure uniform bonding of the latter.

2. A method of inhibiting migration within a mass of granular materials containing soluble silicate as a bonding agent, which comprises uniformly incorporating within the mass not less than substantially 0.4% nor more than substantially 2% of an alkali metal chlorate.

3. In the preparation of plastic and granular refractory materials bonded with a soluble silicate, the method of preventing the migration of said silicate within the mass of material which consists in incorporating in the mixture of aggregate and soluble silicate an alkali metal chlorate in the proportion of not less than substantially 0.4% nor more than substantially 2% of the material to be bonded, the quantity being such as to produce within the mass a continuous gel structure but to leave a substantial portion of the silicate undecomposed.

4. A composition of matter to be incorporated with plastic and granular materials to bond the latter comprising sodium silicate and as an anti-migration agent alkali metal chlorate, the proportion of said agent being not less than substantially 0.4% nor more than substantially 2% of the material to be bonded, the quantity of the chlorate being such as to produce within the mass of said materials when wet a continuous gel structure but to leave a substantial portion of the sodium silicate undecomposed.

FRANK EUGENE LATHE.
NORMAN PERCY PITT.
LISLE HODNETT.